United States Patent [19]

Leung et al.

[11] Patent Number: 5,657,447
[45] Date of Patent: Aug. 12, 1997

[54] PLATFORM-TRANSPARENT REGISTRATION AND BUILD OF STORED PROCEDURES AND USER-DEFINED FUNCTIONS

[75] Inventors: Paul Chun-Hong Leung, San Jose; Frederick Thomas Sharp, Menlo Park; David Y. Chen, San Jose; Judianto Sidik, San Jose; John Shek-Luen Ng, San Jose; Morgan Young, San Jose, all of Calif.

[73] Assignee: International Business Machines Corp., Armonk, N.Y.

[21] Appl. No.: 521,804

[22] Filed: Aug. 31, 1995

[51] Int. Cl.⁶ .................................................. G06F 13/00
[52] U.S. Cl. .................................................. 395/601
[58] Field of Search .................. 395/200.01, 200.09, 395/601, 610, 680, 682, 684

[56] References Cited

U.S. PATENT DOCUMENTS

5,412,805  5/1995  Jordan, II et al. ..................... 395/612
5,515,508  5/1996  Pettus et al. ..................... 395/200.01

*Primary Examiner*—Paul V. Kulik
*Attorney, Agent, or Firm*—Prentiss W. Johnson, Esq.; Sterne, Kessler, Goldstein & Fox P.L.L.C.

[57] ABSTRACT

A system and method for transferring a file from a client platform to a server platform. A procedure_to_invoke parameter is set equal to information identifying a file transfer procedure located at the server platform. A pointer in a first "sqlvar" parameter is caused to point to the string representing the file, and a pointer in a second sqlvar parameter is caused to point to a file name of the file. The first and second sqlvar parameters are part of an input_args parameter. A "sqleproc" function is invoked at the client platform. The procedure_to_invoke and input_args parameters are passed to the sqleproc function. The sqleproc function when executed causes the input_args parameter to be passed to the file transfer procedure at the server platform, and also causes the file transfer procedure to be invoked at the server platform.

39 Claims, 6 Drawing Sheets

PLATFORM-TRANSPARENT REGISTRATION AND BUILD OF STORED PROCEDURES AND USER-DEFINED FUNCTIONS

CROSS-REFERENCE TO OTHER APPLICATIONS

The following applications of common assignee contain some common disclosure, and are believed to have an effective filing date identical with that of the present application.

"SYSTEM AND METHOD FOR ENABLING A COMPILED COMPUTER PROGRAM TO INVOKE AN INTERPRETIVE COMPUTER PROGRAM," application Ser. No. 08/521,805, filed Aug. 31, 1995, incorporated herein by reference in its entirety.

"PASSING STRUCTURES OR ARRAYS AS HOST VARIABLES," application Ser. No. 08/521,710, filed Aug. 31, 1995, incorporated herein by reference in its entirety.

"SYSTEM AND METHOD FOR ENABLING POINTERS TO BE PASSED FROM COMPUTER PROGRAMS WRITTEN USING COMPUTER PROGRAMMING LANGUAGES THAT DO NOT SUPPORT POINTERS," application Ser. No. 08/521,806, filed Aug. 31, 1995, incorporated herein by reference in its entirety.

"NO PREPROCESSOR AND A SOURCE LEVEL DEBUGGER FOR EMBEDDED SQL IN A 3GL," application Ser. No. 08/521,711, filed Aug. 31, 1995, incorporated herein by reference in its entirety.

TECHNICAL FIELD

The present invention relates generally to stored procedures and user-defined functions in database systems, and more particularly to a system and method for registering and building stored procedures and user-defined functions in database systems.

BACKGROUND ART

Stored procedures and user-defined functions are conventionally employed to augment the functional capabilities of database systems. Typically, stored procedures and user-defined functions are developed by programmers at database server platforms (i.e., computers). After they have been fully developed, they are stored in the database server platforms. The stored procedures and user-defined functions may then be invoked by database clients.

The development of procedures and user-defined functions at database server platforms potentially increases the workload at these platforms. Thus, it is often disadvantageous to develop stored procedures and user-defined functions at the database server platforms since such development may degrade system performance. This problem is exacerbated if many programmers are working at the database server platforms at the same time. Also, it is not always possible to develop stored procedures and user-defined functions at the database server computers, particularly when the same application must be deployed to multiple database servers.

One solution to this problem is to have the programmers develop the stored procedures and user-defined functions at database client platforms. This potentially decreases the workload at database server platforms, thereby improving system performance. According to this approach, however, programmers must manually distribute, build, and register the completed stored procedures and user-defined functions at the database server platforms. This can be a very difficult task, especially if there are many database server platforms (in some systems, there are hundreds or even thousands of database server platforms).

Also, distributing, building, and registering stored procedures and user-defined functions are very low-level tasks. To perform such tasks, the programmers must know the physical addresses of the database server platforms (typically, programmers only know the aliases of the database server platforms, where such aliases are abstract, user-friendly representations of the physical addresses), and the process for invoking the build and registration utilities (this may vary from platform to platform). Accordingly, this conventional solution is not ideal.

DISCLOSURE OF INVENTION

Briefly stated, the present invention is directed to a system and method for transferring a file from a client platform to a server platform. The server platform is coupled to the client platform. A "DB2" relational database management system (RDBMS) executes on the server platform.

According to the present invention, the file to be transferred is converted to a string at the client platform. A procedure_to_invoke parameter is set equal to information identifying a file transfer procedure located at the server platform. A pointer in a first "sqlvar" parameter is caused to point to the string, and a pointer in a second sqlvar parameter is caused to point to a file name of the file. The first and second sqlvar parameters are part of an input_args parameter, where the input_args parameter is of a "sqlda" data type. The sqlda data type is suitable for passing scalar values to procedures.

A "sqleproc" function is invoked at the client platform. The sqleproc function is provided by a "client application enablement" (CAE) module that is resident in the client platform and that represents a client component of the DB2 RDBMS. A parameter list of the sqleproc function includes the input_args parameter and the procedure_to_invoke parameter. The sqleproc function when executed causes the input_args parameter to be passed to the file transfer procedure at the server platform, and also causes the file transfer procedure to be invoked at the server platform.

The file transfer procedure at the server platform receives the input_args parameter. The file transfer procedure uses the pointer in the first sqlvar parameter of the input_args parameter to access and retrieve the string. The string is converted to a new file. The file transfer procedure uses the pointer in the second sqlvar parameter of the input_args parameter to access and retrieve the file name. The file transfer procedure stores the new file in the server platform using the file name.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESCRIPTION OF FIGURES

The present invention will be described with reference to the accompanying drawings, wherein.

BEST MODE FOR CARRYING OUT THE INVENTION

The present invention is directed to a system and method for enabling users at client platforms (a "client platform" is a computer that has been set up to access database servers as a client) to distribute their stored procedures and/or user-defined functions from the client platforms to server platforms (also called servers). The present invention also enables the users at the client platforms to make and register their stored procedures and/or user-defined functions at the servers. The invention provides this functionality in an user-friendly manner. In particular, the invention does not require that users have knowledge of low-level details (such as the physical paths to server platforms) in order to distribute, make, and register their stored procedures and/or user-defined functions.

Figure 1:
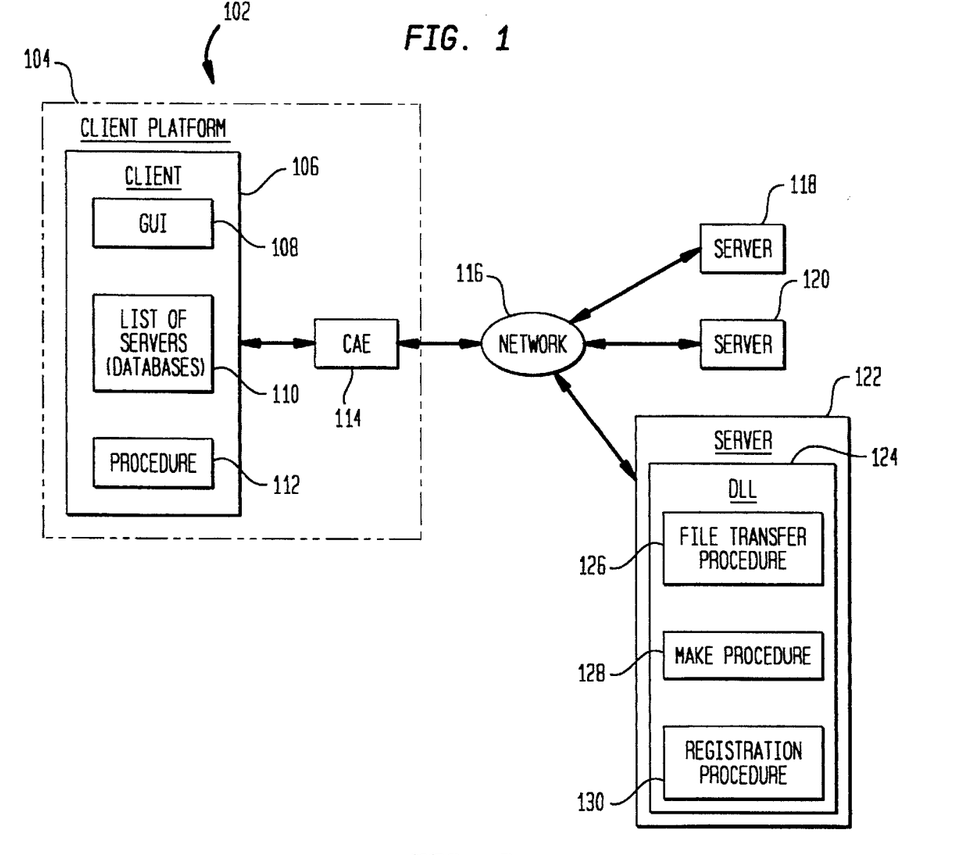
FIG. 1 is a block diagram of a database system according to a preferred embodiment of the invention.

FIG. 1 is a block diagram of a database system 102 according to a preferred embodiment of the present invention. The database system 102 includes a plurality of client platforms, such as client platform 104, and a plurality of server platforms (also called servers), such as servers 118, 120, 122, connected to each other via a network 116.

The servers 118, 120, 122 each represent a relational database management system (RDBMS). Preferably, the RDBMS at each server 118, 120, 122 is DB2 available from International Business Machines (IBM Corporation). Specifically, the RDBMS is DB2 for Workstations (such as DB2 for AIX/6000, DB2 for OS/2, etc.). More particularly, the RDBMS is DB2 for Workstations Version 2.1 or greater. Pertinent aspects of DB2 are described in many publicly available documents, such as DATABASE 2 OS/2 Programming Reference, Order Number S62G-3666-00, March 1993, DATABASE 2 AIX/6000 Programming Reference, Order Number SC09-157300, 1993, and IBM Operating System/2 Extended Edition Database Manager Programming Guide and Reference, 90X7905, 1993, which are incorporated herein by reference in their entireties.

Each server 118, 120, 122 includes a software library, such as a dynamic link library (DLL) 124, containing software procedures that may be invoked by clients 106. For purposes of the present invention, the DLL 124 includes a file transfer procedure 126, a make procedure 128, and a registration procedure 130, although in practice the DLL 124 may contain other software procedures. The file transfer procedure 126, the make procedure 128, and the registration procedure 130 are described below.

The client platform 104 includes one or more clients, such as client 106. The client 106 accesses the data and procedures at the servers 118, 120, 122. According to the present invention, the client 106 may also develop stored procedures and/or user-defined functions at the client platform 104, and distribute, make, and register such stored procedures and/or user-defined functions to one or more of the servers 118, 120, 122. This is described in greater detail below.

The client platform 104 also includes a client application enablement (CAE) module 114. The CAE 114 is a component of the DB2 RDBMS executing in each client platform 104. The CAE 114 enables the client 106 to interact with the DB2 RDBMS at each server 118, 120, 122. According, the CAE 114 represents the client component of DB2.

The CAE 114 is consistent with the well known DARI (Database Application Remote Interface) application programming interface (API). The DARI API specifies a user interface for remotely accessing database functions. The DARI API does not require that users have knowledge of low-level details in order to access such database functions. For example, according to the DARI API, users need only know the alias of a server platform in order to interact with the resident server. Users need not know the actual, physical address of the server platform.

Since it is consistent with the DARI API, the CAE 114 enables users to interact with the DB2 RDBMS at each server 118, 120, 122 in an user-friendly manner. However, the functionality of the CAE 114 is limited. For example, the CAE 114 does not provide any facilities for enabling the transfer of files between a client platform and a server platform. Pertinent aspects of the CAE 114 are described in many publicly available documents, such as DATABASE 2 OS/2 Programmin Reference, Order Number S62G-3666-00, March 1993, DATABASE 2 AIX/6000 Programming Reference, Order Number SC09-1573-00, 1993, and IBM Operating System/2 Extended Edition Database Manager Programming Guide and Reference, 90X7905, 1993, which are incorporated herein by reference in their entireties.

As noted above, the present invention enables users at client platforms 104 to distribute their stored procedures and/or user-defined functions from the client platforms 104 to the servers 118, 120, 122. The present invention also enables the users at the client platforms 104 to make and register their stored procedures and/or user-defined functions at the servers 118, 120, 122. The invention provides this functionality in an user-friendly manner. In particular, the invention does not require that users have knowledge of low-level details (such as the physical paths to server platforms) in order to distribute, make, and register their stored procedures and/or user-defined functions.

Generally, the invention achieves its "user-friendliness" by employing the CAE 114 to interact with the DB2 RDBMS at each server 118, 120, 122. As noted above, however, the functionality of the CAE 114 is limited. There are some functions not provided by the CAE 114 that the invention requires. The invention overcomes these limitations of the CAE 114 by, in effect, extending the functional capability set of the CAE 114.

For example, a file transfer capability is necessary in order to distribute stored procedures and/or user-defined functions from the client platforms 104 to the servers 118, 120, 122. The CAE 114, however, does not provide any facilities for enabling the transfer of files between a client platform 104 and a server platform 118, 120, 122.

Conventionally, file transfer between the client platform 104 and the server platforms 118, 120, 122 is achieved by using a mechanism that does not involve the CAE 114, such as the well known FTP (file transfer protocol). To use FTP, users must have knowledge of low-level details, such as the physical addresses of servers, and whether to transfer as ASCII or binary. They must also separately log on to the server, and navigate to an appropriate location in the directory structure on the server. Navigation requires knowledge of appropriate operating-system-specific directory commands. FTP may require additional installation for OS/2 and Windows users. Accordingly, the use of FTP is not user-friendly. In contrast, the invention extends the functional capability set of the CAE 114 to enable the CAE 114 to transfer files, and then uses the CAE 114 to transfer files between the client platform 104 and the servers 118, 120, 122. Since it uses the CAE 114 to perform this function, the transfer of files is performed in an user-friendly manner.

Figure 2:
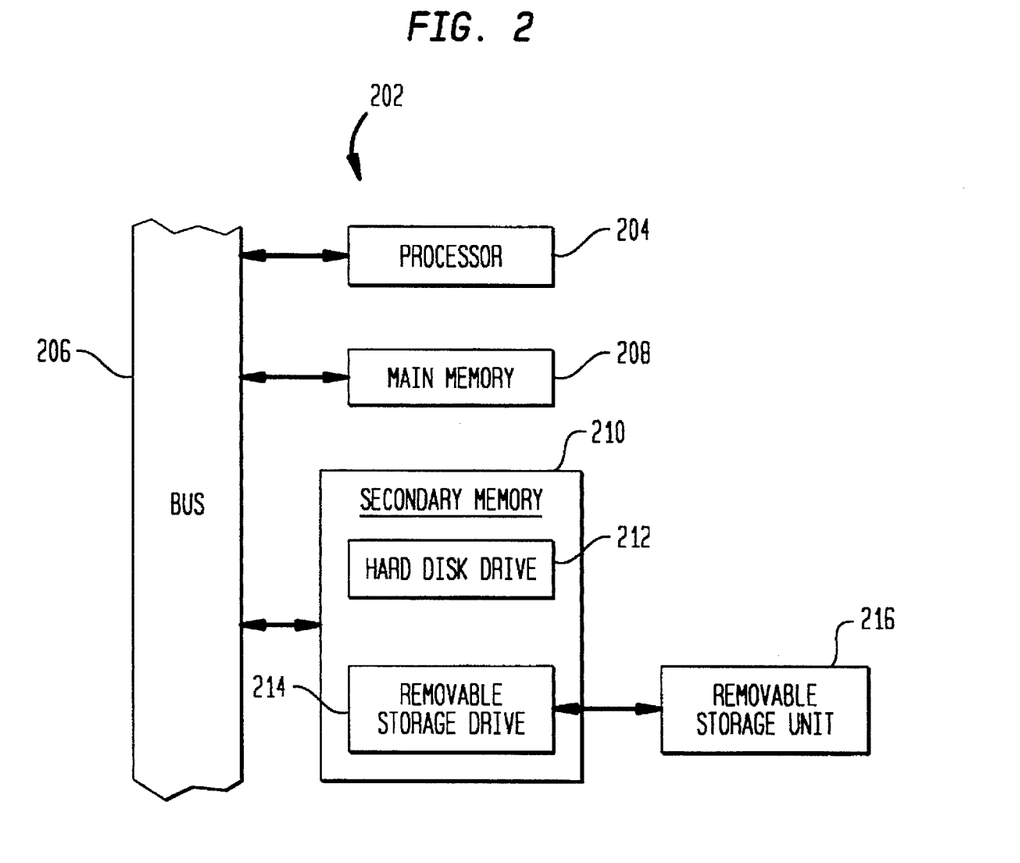
FIG. 2 is a block diagram of a preferred computer useful for implementing components of the database system of FIG. 1.

FIG. 2 is a block diagram of a computer 202 used to implement elements of the invention. The client platform 104 and the server platforms 118, 120, 122 may be implemented using computers such as the computer 202 in FIG. 2.

The computer 202 includes one or more processors, such as processor 204. The processor 204 is connected to a communication bus 206.

The computer 202 also includes a main memory 208, preferably random access memory (RAM), and a secondary memory 210. The secondary memory 210 includes, for example, one or more hard disk drives 212 and/or one or more removable storage drives 214, each representing a floppy disk drive, a magnetic tape drive, a compact disk drive, etc. These devices may be connected directly to the bus 206 or may be connected over a network (not shown). The removable storage drives 214 each reads from and/or writes to a removable storage unit 216 in a well known manner.

Removable storage unit 216, also called a program storage device or a computer program product, represents a floppy disk, magnetic tape, compact disk, etc. As will be appreciated, the removable storage unit 216 includes a computer usable storage medium having stored therein computer software and/or data.

Computer programs (also called computer control logic) are stored in main memory 208 and/or the secondary memory 210. Such computer programs, when executed, enable the computer 202 to perform the features of the present invention as discussed herein. In particular, the computer programs, when executed, enable the processor 204 to perform the features of the present invention. Accordingly, such computer programs represent controllers of the computer 202. The client 106, the CAE 104, and the DB2 RDBMS at the servers 118, 120,122 represent computer programs executing in their respective computers 202.

In another embodiment, the invention is directed to a computer program product comprising a computer readable medium having control logic (computer software) stored therein. The control logic, when executed by the processor 204, causes the processor 204 to perform the functions of the invention as described herein.

In another embodiment, the invention is implemented primarily in hardware using, for example, one or more hardware state machines. Implementation of such hardware state machines so as to perform the functions described herein will be apparent to persons skilled in the relevant art(s).

SQLEPROC Function

The CAE 114 supports a function called sqleproc, where "sql" stands for the well known structured query language, and "proc" stands for procedure. As will be appreciated by persons skilled in the relevant art(s), the structured query language is the well known database language of the DB2 RDBMS.

The sqleproc function is documented in a number of publicly available documents, such as DATABASE 2 OS/2 Programming Reference, Order Number S62G-3666-00, March 1993, DATABASE 2 AIX/6000 Programming Reference, Order Number SC09-157300, 1993, and IBM Operating System/2 Extended Edition Database Manager Programming Guide and Reference, 90X7905, 1993, which are incorporated herein by reference in their entireties. The documented purpose of the sqleproc function, as stated in all such documents known to the Inventors, is to enable a client to remotely invoke a procedure located at a server. For example, the client 106 could utilize the sqleproc function to invoke at the server 122 the file transfer procedure 126, the make procedure 128, and/or the registration procedure 130. Once invoked, these procedures 126, 128, 130 would execute at the server 122.

The syntax of the sqleproc function is as follows:

```
return_code (procedure_to_invoke,
         =
      sqleproc
            info_field,
            input_args,
            output_args,
            communication_area)
```

As evident from the above, the parameter list of the sqleproc function includes: procedure_to_invoke, info_field, input_args, output_args, and communication_area.

The procedure_to_invoke parameter is a string that specifies the procedure that the client wants to invoke.

For AIX/6000 servers, this string must include the path to the procedure relative to the relevant server; however, OS/2 servers can find the procedure if its path is included in the LIBPATH. For example, suppose that the client 106 wanted to invoke the make procedure 128 at server 122. In this case, the procedure_to_invoke parameter for AIX/6000 would be of the form:

"path\DLL!<entry point into DLL>"

For OS/2:

"DLL!<entry point into DLL>"

where "path" specifies the path to the DLL 124 relative to the server 122, "DLL" refers to the DLL 124, and "<entry point into DLL>" represents information that identifies the entry point into the DLL 124 corresponding to the make procedure 128.

The info_field in the sqleproc function has the database varying character datatype, and is typically unused.

The input_args in the sqleproc function are input, scalar arguments that are passed to the procedure that is being called (i.e., the procedure identified by the procedure_to_invoke parameter). The input_args are discussed further below.

The output_args in the sqleproc function are output, scalar arguments that are returned from the procedure that is being called (i.e., the procedure identified by the procedure_to_invoke parameter). The output_args are discussed further below.

The communication_area in the sqleproc function is an sqlca ("sqlca" stands for SQL communication area) structure that contains status codes that are returned by the sqleproc function. These status codes specify the status of the call to the procedure identified by the procedure_to_invoke parameter (i.e., whether the procedure successfully executed, did not execute, the reasons for failure, etc.). Additional status information is returned by the sqleproc function (return_code).

The sqlda Data Structure

The CAE 114 supports an sqlda data structure ("sql" stands for structured query language, and "da" stands for descriptor area). The input_args parameter and the output_args parameter in the sqleproc function are variables of type sqlda.

The sqlda data structure is documented in a number of publicly available documents, such as DATABASE 2 OS/2 Programming Reference, Order Number S62G-3666-00, March 1993, DATABASE 2 AIX/000 Programming Reference, Order Number SC09-1573-00, 1993, and IBM Operating System/2 Extended Edition Database Manager Programming Guide and Reference, 90X7905, 1993, which are incorporated herein by reference in their entireties. The documented purpose of the sqlda data structure, as stated in all such documents known to the Inventors, is to pass scalar values between a host language and DB2, including values that describe the columns of a resultset row for a query specified for an SQL PREPARE statement (the sqlda contains a description of the output columns from DB2), or for an SQL SELECT statement (the sqlda contains a description of the host variables to receive the values of a row, input to DB2), and values passed to or received from procedures that are called using the sqleproc function. The sqlda data structure is not intended, and not capable of, passing vector values.

The term "scalar value" is well known, and refers to a value having a single value and/or dimension. Integers and strings are examples of scalar values. Likewise, the term "vector value" is well known, and refers to an array of values or structured data values. Arrays and tables are examples of vector values. A file can be read into memory as a vector value (a file containing an array of strings or an array of structures, for example), or as a scalar value (a file containing a single string, for example). For reference purposes, files read into memory as vector values are called vector files, and files read into memory as scalar values are called scalar files. Typically, files associated with procedures and user-defined functions represent vector files.

The syntax of the sqlda data structure is as follows:

```
type sqlda
    sqldaid /* An identifier */
    sqldabc /* SQLDA size in bytes */
    sqln /* Number of sqlvar parameters */
    sqld /* Number of sqlvar parameters used */
    sqlvar1
    sqlvar2
    *
    *
    *
    sqlvarN
end
```

The sqldabc parameter specifies the size of a variable of type sqlda. For example, for an sqlda with 10 sqlvars, the sqldabc will preferably be 16+(44*10) bytes.

The sqlda data structure allows a variable number of sqlvar parameters. The total number of sqlvar parameters for any given parameter of type sqlda is specified in the sqln field. The actual number of sqlvar parameters used is specified in the sqld field.

Figure 6:
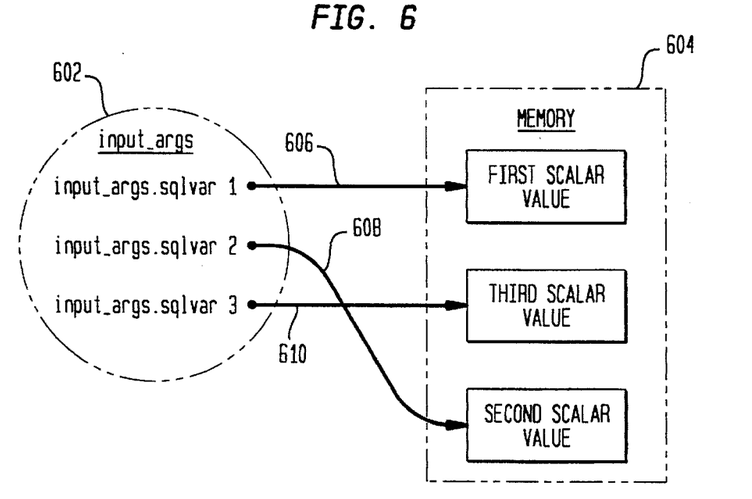
FIG. 6 is used to describe sqlvars in an sqlda data structure type.

Scalar values that are to be passed to the procedure identified by the procedure_to_invoke parameter are associated with the sqlvar parameters on an one-to-one basis. Each sqlvar parameter includes a pointer. The scalar values that are to be passed to the procedure are stored in areas of memory. The pointers in the sqlvar parameters are then set so they point to these areas in memory. For example, this is shown in FIG. 6, where the input_arg parameter 602 includes an sqlvar1 parameter having a pointer 606 that points to a first scalar value in a memory 604 (corresponding to the main memory 208 and/or the secondary memory 210 in the client 106), an sqlvar2 parameter having a pointer 608 that points to a second scalar value, and an sqlvar3 parameter having a pointer 610 that points to a third scalar value.

Distributing, Making, and Registering Stored Procedures and User-defined Functions The operation of the invention when distributing, making, and registering stored procedures and user-defined functions shall now be described. It is noted that "stored procedure" in the context of the present invention is a well known term and refers to a procedure that runs at the location of the database server and that is called by a database client application. Likewise, "user-defined function" in the context of the present invention is a well known term and refers to a function that runs at the location of the database server and that is called by the DBMS, and that is specified in an SQL statement. Stored procedures and user-defined functions are collectively called "procedures" herein.

Figure 3:
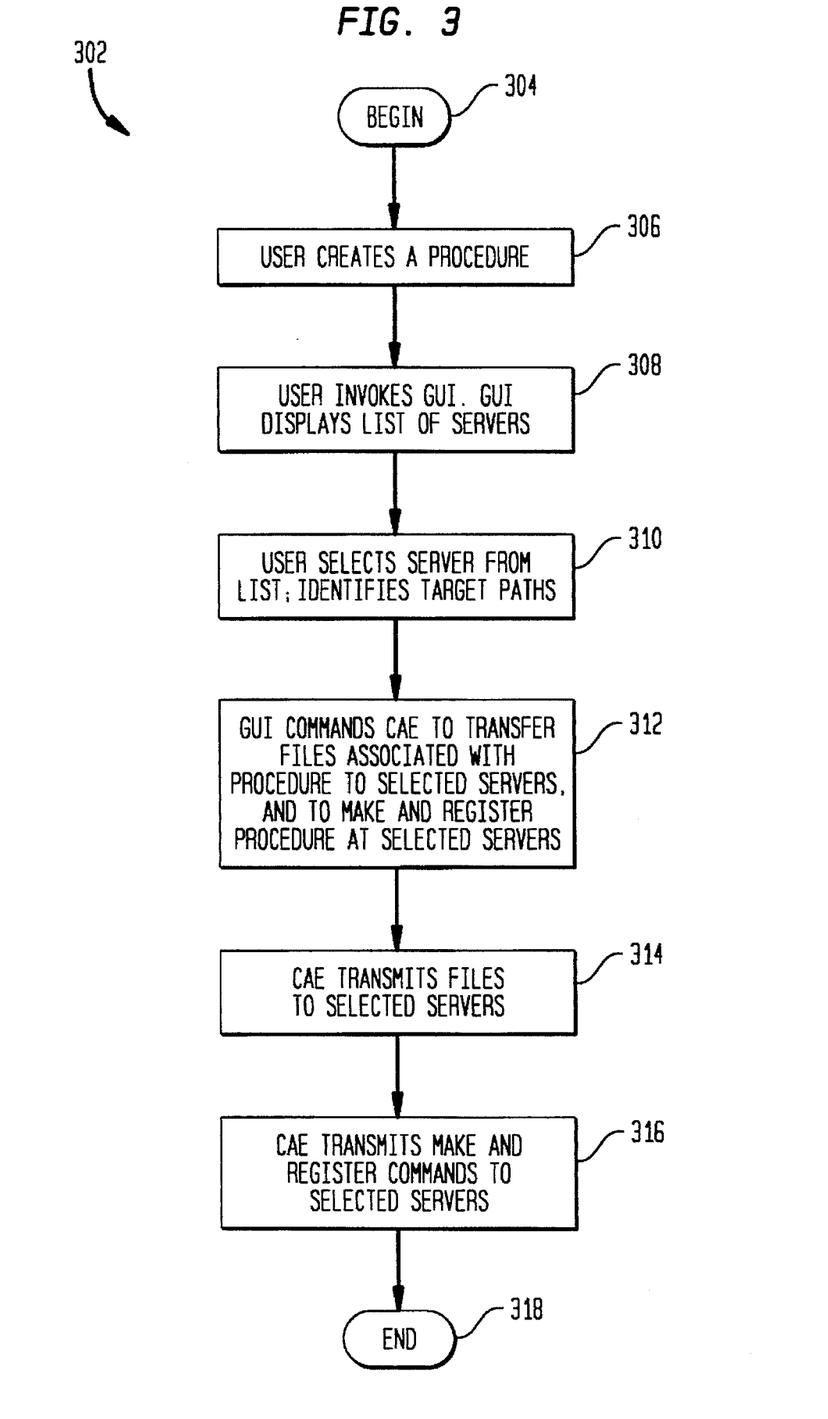
FIGS. 3–5 and 7 are flowcharts depicting the preferred operation of the invention.

Flowchart 302 in FIG. 3 depicts the operation of the invention when distributing, making, and registering stored procedures and user-defined functions. Flowchart 302 begins with step 304, where control immediately passes to step 306.

In step 306, an user at the client platform 104 creates a procedure 112 to perform a desired function in a well known manner.

When the user is ready to distribute the procedure 112 to one or more of the servers 118, 120, 122, the user performs step 308. In step 308, the user invokes a GUI (graphical user interface) 108. The GUI 108 is part of the client 106. The GUI 108 displays a preferably scrollable list 110 of all databases available in the database system 102. This information is obtainable from DB2 in a well known manner. The list 110 includes an alias of each database.

As will be appreciated by persons skilled in the relevant art(s), each alias specifies a database and a server 118, 120, or 122 on which the database resides.

In step 310, the user selects one or more database aliases from the list 110. The stored procedure will be distributed to the servers 118, 120, and/or 122 on which the databases associated with the selected database aliases respectively reside (as described below). For reference purposes, these servers 118, 120, and/or 122 are called target (or destination) servers.

Figure 4:
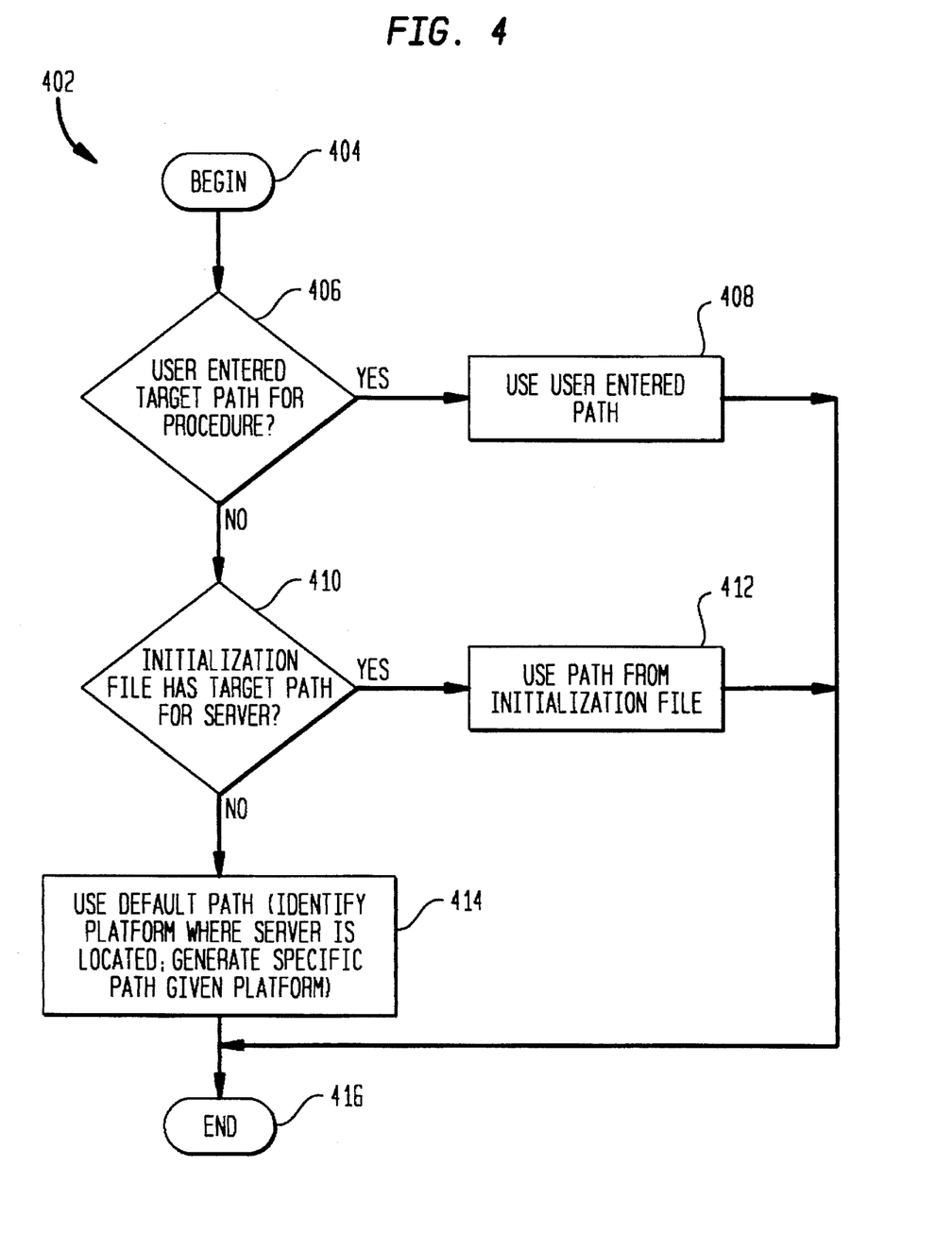

The user in step 310 also specifies a target path for each target server. The target path specifies the area in storage of the target server where the linked procedure will be stored (after the make process has been performed). Flowchart 402 in FIG. 4 depicts the manner in which the invention determines this target path for each selected database. If the user in step 310 explicitly entered a target path, then this target path is used (steps 406 and 408). If the user in step 310 did not enter an explicit target path, then the GUI 108 in step 410 determines whether a target path for the target server was previously specified in an initialization file stored at the client platform 104 (the initialization file may have previously been created by a system administrator, for example). If such a target path exists in the initialization file, then this target path is used (step 412). Otherwise, the GUI 108 uses a default path as the target path (step 414). The GUI 108 customizes this default path for the particular target server by obtaining the DB2 installation path from DB2 via the CAE 114 in a well known manner, and adding the path to the server (that is preferably in the DB2 installation path).

In step 312, the GUI 108 commands the CAE 114 to transfer the file(s) associated with the procedure 112 to stored procedures on the servers 118, 120, and/or 122 (i.e., the target servers) on which the selected databases reside. (There may be one or more files associated with the procedure 112, such as the main routine, subroutines, library routines, header files, data files, etc.) The GUI 108 also commands these stored procedures on the servers 118, 120, and/or 122 (via the CAE 114) to make and register the procedure 112.

In response to the commands received in step 312, the CAE 114 in step 314 transmits the file(s) associated with the procedure 112 to the target servers. Also, the CAE 114 in step 316 transmits to the target servers commands to make the procedure 112.

Preferably, the CAE 114 uses the sqleproc function (described above) to invoke the make stored procedure 128 at each target server. The make stored procedure 128 operates to make (or build) the procedure 112. Approaches for making or building procedures are well known. Any of these may be used to implement the make stored procedure 112. Alternatively, the make procedure 112 is implemented in accordance with the teachings of U.S. U.S. patent applications Ser. No. 08/521,805, filed Aug. 31, 1995, "SYSTEM AND METHOD FOR ENABLING A COMPILED COMPUTER PROGRAM TO INVOKE AN INTERPRETIVE COMPUTER PROGRAM," incorporated herein by reference in its entirety.

The CAF 114 in step 316 also transmits to the target servers commands to stored procedures that register the procedure 112. Preferably, the CAE 114 uses the sqleproc function (described above) to invoke the registration stored procedure 130 at each target server. The registration stored procedure 130 operates to register the procedure 112 with the DB2 RDBMS at each target server. Approaches for registering procedures with the DB2 RDBMS are well known. Any of these may be used to implement the registration procedure 130.

Flowchart 302 is complete after the performance of step 316, as indicated by step 318.

Using the CAE to Transfer Files

As explained above, in step 312 of flowchart 302 the GUI 108 commands the CAE 114 to transmit the file(s) associated with the procedure 112 to the target servers. The CAE 114 5 performs such file transfer in step 314. However, as discussed above, the CAE 114 provides no facilities for transferring files between platforms.

According to the present invention, the sqleproc function provided by the CAE 114 is used to transfer files. Such use represents an undocumented use of the sqleproc function, since the sqleproc function is intended only to remotely invoke procedures. This undocumented use of the sqleproc function was discovered and developed by the Inventors. This use of the sqleproc function is represented by a flowchart 502 in FIG. 5. The GUI 108 performs the steps of flowchart 502 in step 312 (FIG. 3) for each target server. Flowchart 502 begins with step 504, where control immediately passes to step 506.

Figure 5:
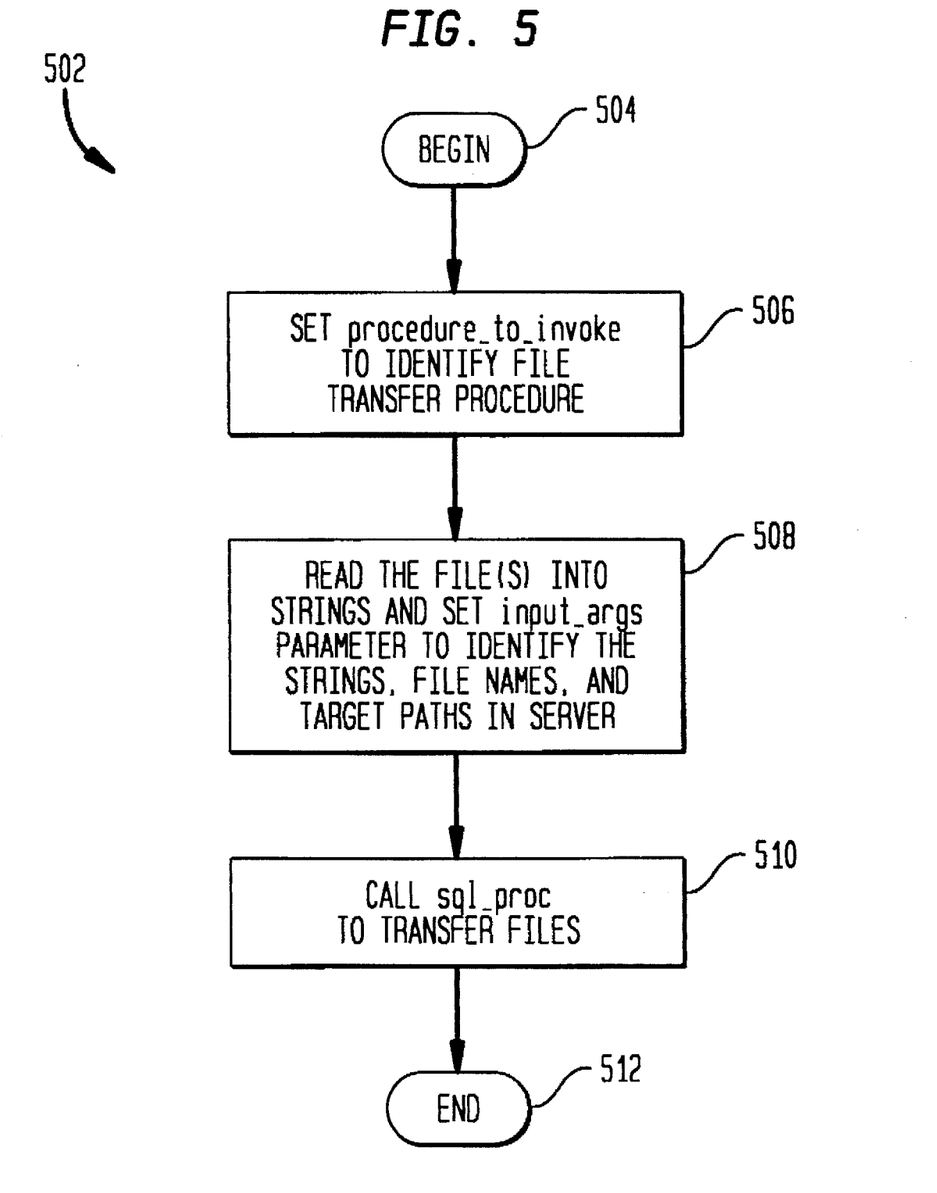

In step 506, the GUI 108 sets the procedure_to_invoke parameter in the sqleproc function equal to a string that identifies the file transfer stored procedure 126, and the path to the file transfer stored procedure 126 in the target server being processed. The DB2 installation path information is obtainable from DB2 in a well known manner, to which the GUI adds the path to the server stored procedure for file transfer.

In step 508, the GUI 108 sets the input_args parameter in the sqleproc function to identify and include the contents of the file(s) associated with the procedure 112, the names of these files, and the target path in the target server for the linked procedure (this target path for the target server being processed was determined in step 310 of flowchart 302). In particular, the GUI 108 sets the pointers in the sqlvar parameters to point to areas in memory that contain the contents of the files associated with the procedure 112, an area of memory (or multiple areas of memory) that store the names of these files, and an area of memory that stores information that identifies the target path for the linked procedure (linking is performed during the make process.).

This is represented in FIG. 6, for example, where the first scalar value represents the file corresponding to the procedure 112 (in this example, the procedure 112 only has one file), the second scalar value represents a string that is equal to the name of the file, and the third scalar value represents a string that is equal to the target path for the linked procedure.

It is noted that the file corresponding to the procedure 112 is preferably a vector value, not a scalar value. The sqlda data structure cannot accommodate vector values. Thus, the sqlda data structure cannot be used to pass this file to the procedure identified by the procedure_to_invoke parameter. Consequently, according to the present invention, the GUI 108 converts the file to a string (strings are scalar values; accordingly, strings may be passed using the sqlda data structure). The first scalar value in the example of FIG. 6 represents this string representation of the file associated with the procedure 112.

The GUI 108 converts each file associated with the procedure 112 to a string using any well known process, such as reading the file into memory one character or one line at a time, concatenating each line to a string, and concatenating specific strings to delimit lines and files. This continues until all files have been read into strings.

In step 510, the GUI 108 invokes the sqleproc function having the procedure_to_invoke parameter as set in step 506, and the input_args parameter as set in step 508. Flowchart 502 is complete after step 510 is performed, as indicated by step 512.

In response to the GUI 108's invocation of the sqleproc function in step 510, the CAE 114 in step 314 of flowchart 302 (FIG. 3) performs the sqleproc function. In doing so, the CAE 114 transmits the file(s) (via the input_args parameter) associated with the procedure 112 to the file transfer procedure 126 in the target server being processed. As noted above, the steps of flowchart 502 are performed for each target server, such that the file(s) associated with the procedure 112 are sent to all of the target servers.

Operation of the File Transfer Procedure

As noted above, in step 314 of flowchart 302 (FIG. 3) the CAE 114 performs the sqleproc function. In doing so, the CAE 114 sends a command to the DB2 RDBMS in each target server to invoke the file transfer procedure 126. As part of such operation, the data stored in the memory areas (of the client 106) addressed by the pointers in the sqlvars of the input_args parameter are transferred to the target servers. These pointers are then adjusted to address memory areas in the target servers where the transferred data are stored. Such operation of the sqleproc function is well known.

Figure 7:
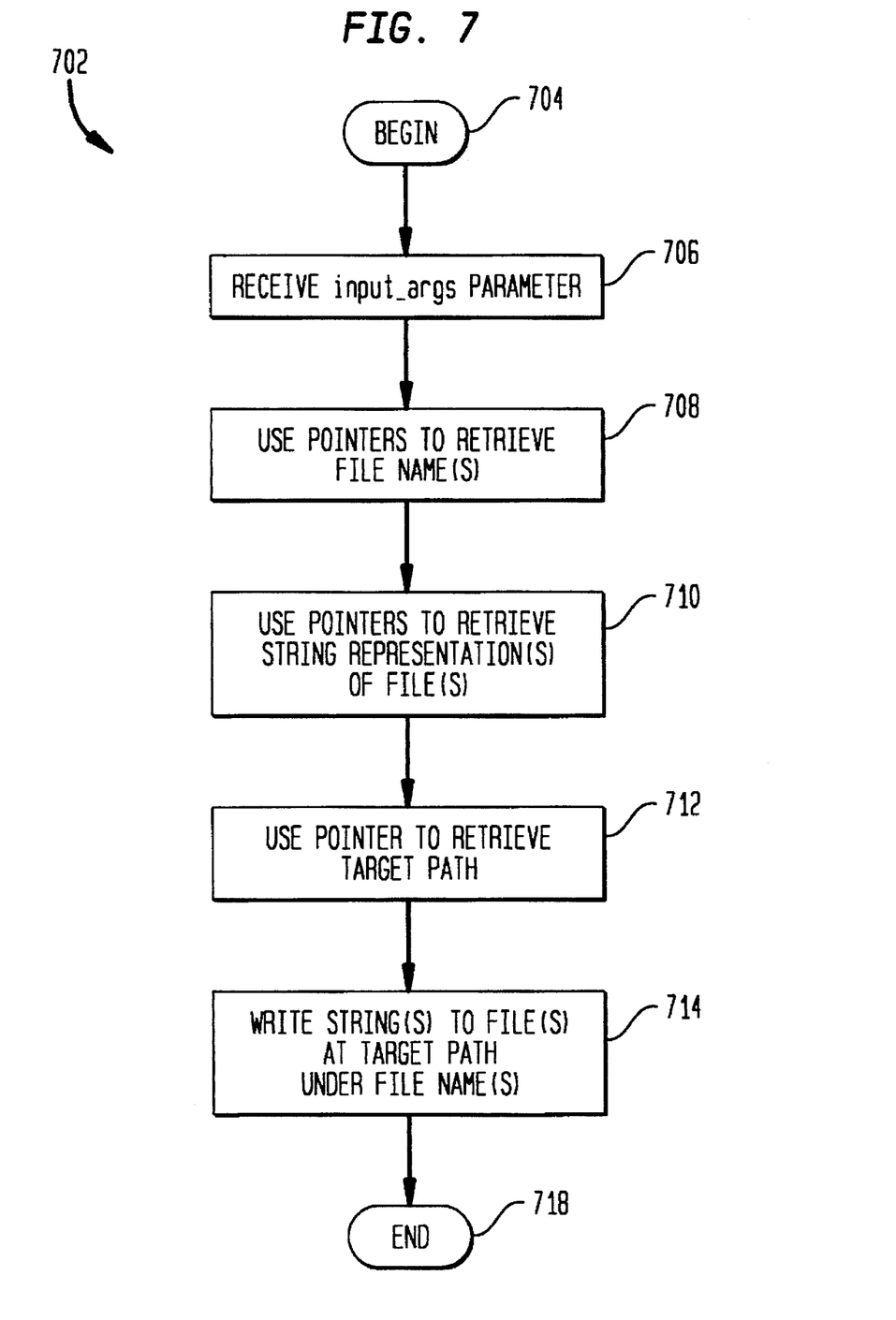

The operations performed by the file transfer procedure 126 (once invoked) are represented by flowchart 702 in FIG. 7. Flowchart 702 begins with step 704, where control immediately passes to step 706.

In step 706, the file transfer procedure 126 receives the input__args parameter.

In step 708, the file transfer procedure 126 uses the pointers in the sqlvars of the input__args parameter to retrieve the file name(s) of the file(s) associated with the procedure 112. The use of pointers to reference memory areas, and to retrieve data from such memory areas, is well known.

In step 710, the file transfer procedure 126 uses the pointers in the sqlvars of the input__args parameter to retrieve the string representation(s) of the file(s) associated with the procedure 112.

In step 712, the file transfer procedure 126 uses the pointers in the sqlvars of the input__args parameter to retrieve the target path.

In step 714, the file transfer procedure 126 writes the string representation(s) (retrieved in step 710) to file(s) (preferably one file per string representation). The procedure for writing a string to a file is analogous to the procedure for converting a file to a string (described above), and will be apparent to persons skilled in the relevant art(s). The files are written under the file names retrieved in step 708. The file format is implementation dependent.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Having thus described our invention, what we claim as new and desire to secure by Letters Patent is:

1. A method of transferring a file from a client platform to a server platform, the server platform coupled to the client platform, a "DB2" relational database management system (RDBMS) executing on the server platform, the method comprising the steps of:

(1) at the client platform, converting the file to a string;

(2) at the client platform, causing a pointer in an input__args parameter to point to said string, said input__args parameter being of a "sqlda" data type, said pointer being part of a "sqlvar" parameter defined by the sqlda data type, the sqlda data type being suitable for passing scalar values to procedures; and (3) at the client platform, invoking a "sqleproc" function provided by a "client application enablement" (CAE) module, the CAE module being resident in the client platform and representing a client component of the DB2 RDBMS, a parameter list of said sqleproc function comprising said input__args parameter and a procedure__to__invoke parameter that identifies an user-specified procedure located on the server platform, said sqleproc function when executed causing said input__args parameter to be passed to said user-specified procedure at the server platform, and also causing said user-specified procedure to be invoked at the server platform.

2. A method of transferring a file from a client platform to a server platform, the client platform coupled to the server platform, a "DB2" relational database management system (RDBMS) executing on the server platform, the method comprising the steps of:

(1) at the client platform, converting the file to a string;

(2) at the client platform, setting a procedure__to__invoke parameter equal to information identifying a file transfer procedure located at the server platform;

(3) at the client platform, causing a pointer in a first "sqlvar" parameter to point to said string, and causing a pointer in a second sqlvar parameter to point to a file name of the file, the first and second sqlvar parameters being part of an input__args parameter, the input__args parameter having a "sqlda" data type, the sqlda data type being suitable for passing scalar values to procedures; and (4) at the client platform, invoking a "sqleproc" function provided by a "client application enablement" (CAE) module, the CAE module being resident in the client platform and representing a client component of the DB2 RDBMS, a parameter list of said sqleproc function comprising said input__args parameter and said procedure__to__invoke parameter, said sqleproc function when executed causing said input__args parameter to be passed to said file transfer procedure at the server platform, and also causing said file transfer procedure to be invoked at the server platform.

3. The method of claim 2, further comprising the steps of:

(5) at the server platform, receiving the input__args parameter;

(6) at the server platform, using said pointer in said first sqlvar parameter of the input__args parameter to access and retrieve said string;

(7) at the server platform, using said pointer in said second sqlvar parameter of the input__args parameter to access and retrieve said file name; and (8) at the server platform, writing said string to a new file in the server platform using said file name.

4. The method of claim 3, further comprising the step of:

(9) at the client platform, causing a pointer in a third sqlvar parameter to point to a target path string.

5. The method of claim 4, further comprising the step of:

(10) at the server platform, using said pointer in said third sqlvar parameter of the input__args parameter to access and retrieve said target path string;

wherein step (8) comprises the step of:

at the server platform, writing said string to a new file using said file name at a location in said server platform identified by said target path string.

6. A method of transferring a file from a client platform to a server platform, the client platform coupled to the server platform, a "DB2" relational database management system (RDBMS) executing on the server platform, the method comprising the steps of:

(1) at the server platform, receiving an input__args parameter being of a "sqlda" data type, said input__args parameter comprising a "sqlvar" parameter defined by said sqlda data type, said sqlvar parameter comprising a pointer pointing to a string that was transferred from the client platform to the server platform, said string being a string representation of a file located on the client platform;

(2) at the server platform, using said pointer in said sqlvar parameter of the input__args parameter to access and retrieve said string;

(3) at the server platform, writing said string to a new file.

7. The method of claim 6, wherein said input__args parameter comprises a second sqlvar parameter having a pointer that points to a file name of said file, and a third sqlvar parameter having a pointer that points to a target path string, the method further comprising the steps of:

(4) at the server platform, using said pointer in said second sqlvar parameter of the input__args parameter to access and retrieve said file name; and (5) at the server platform, using said pointer in said third sqlvar parameter of the input_args parameter to access and retrieve said target path string;

wherein step (3) comprises the step of:

at the server platform, writing said string to a new file using said file name at a location in said server platform identified by said target path string.

8. A method for enabling an user to distribute a procedure from a client platform to a plurality of server platforms, and for enabling the user to make and register the procedure at the server platforms, a "DB2" relational database management system (RDBMS) executing on each server platform, comprising the steps of:

(1) at the client platform, displaying a list of servers;

(2) at the client platform, enabling the user to select any of said servers;

(3) at the client platform, commanding a "client application enablement" (CAE) module to distribute a file associated with the procedure to the selected servers, the CAE module being resident in the client platform and representing a client component of the DB2 RDBMS; and (4) at the client platform, commanding the CAE module to cause the selected servers to make and register the procedure;

wherein step (3) comprises the steps of:

(a) converting the file to a string;

(b) setting a procedure_to_invoke parameter equal to information identifying a file transfer procedure located at each selected server;

(c) causing a pointer in a first "sqlvar" parameter to point to said string, and causing a pointer in a second sqlvar parameter to point to a file name of the file, the first and second sqlvar parameters being part of an input_args parameter, the input_args parameter having a "sqlda" data type, the sqlda data type being suitable for passing scalar values to procedures; and (d) invoking for each selected server a "sqleproc" function provided by the CAE module, a parameter list of said sqleproc function comprising said input_args parameter and said procedure_to_invoke parameter, said sqleproc function when executed causing said input_args parameter to be passed to said file transfer procedure at each selected server, and also causing said file transfer procedure to be invoked at each selected server.

9. The method of claim 8, further comprising the steps of:

(5) at each server, receiving the input_args parameter;

(6) at each server, using said pointer in said first sqlvar parameter of the input_args parameter to access and retrieve said string;

(7) at each server, using said pointer in said second sqlvar parameter of the input_args parameter to access and retrieve said file name; and (8) at each server, writing said string to a new file in said each server using said file name.

10. The method of claim 8, wherein step (4) comprises the step of:

setting the procedure_to_invoke parameter equal to information identifying a make function located at each selected server; and invoking for each selected server the "sqleproc" function, said sqleproc function when executed causing each selected server to invoke the make function, the make function when executed operating to make the procedure.

11. The method of claim 8, wherein step (4) comprises the step of:

setting the procedure_to_invoke parameter equal to information identifying a registration function located at each selected server; and invoking for each selected server the "sqleproc" function, said sqleproc function when executed causing each selected server to invoke the registration function, the registration function when executed operating to register the procedure with the DB2 RDBMS at said each selected server.

12. A system of transferring a file from a client platform to a server platform, the client platform coupled to the server platform, a "DB2" relational database management system (RDBMS) executing on the server platform, the system comprising:

means, at the client platform, for converting the file to a string;

means, at the client platform, for setting a procedure_to_invoke parameter equal to information identifying a file transfer procedure located at the server platform;

means, at the client platform, for causing a pointer in a first "sqlvar" parameter to point to said string, and causing a pointer in a second sqlvar parameter to point to a file name of the file, the first and second sqlvar parameters being part of an input_args parameter, the input_args parameter having a "sqlda" data type, the sqlda data type being suitable for passing scalar values to procedures; and means, at the client platform, for invoking a "sqleproc" function provided by a "client application enablement" (CAE) module, the CAE module being resident in the client platform and representing a client component of the DB2 RDBMS, a parameter list of said sqleproc function comprising said input_args parameter and said procedure_to_invoke parameter, said sqleproc function when executed causing said input_args parameter to be passed to said file transfer procedure at the server platform, and also causing said file transfer procedure to be invoked at the server platform.

13. The system of claim 12, further comprising:

means, at the server platform, for receiving the input_args parameter;

means, at the server platform, for using said pointer in said first sqlvar parameter of the input_args parameter to access and retrieve said string;

means, at the server platform, for using said pointer in said second sqlvar parameter of the input_args parameter to access and retrieve said file name; and writing means, at the server platform, for writing said string to a new file in the server platform using said file name.

14. The system of claim 13, further comprising:

means, at the client platform, for causing a pointer in a third sqlvar parameter to point to a target path string.

15. The system of claim 14, further comprising:

means, at the server platform, for using said pointer in said third sqlvar parameter of the input_args parameter to access and retrieve said target path string;

wherein said writing means includes means for writing said string to a new file using said file name at a location in said server platform identified by said target path string.

16. A server platform coupled to a client platform, a "DB2" relational database management system (RDBMS) executing on the server platform, the server platform comprising:

means for receiving an input_args parameter being of a "sqlda" data type, said input_args parameter comprising a "sqlvar" parameter defined by said sqlda data type, said sqlvar parameter comprising a pointer pointing to a string that was transferred from the client platform to the server platform, said string being a string representation of a file located on the client platform;

means for using said pointer in said sqlvar parameter of the input_args parameter to access and retrieve said string; and writing means for writing said string to a new file in the server platform.

17. The server platform of claim 16, wherein said input_args parameter comprises a second sqlvar parameter having a pointer that points to a file name of said file, and a third sqlvar parameter having a pointer that points to a target path string, the server platform further comprising:

means for using said pointer in said second sqlvar parameter of the input_args parameter to access and retrieve said file name; and means for using said pointer in said third sqlvar parameter of the input_args parameter to access and retrieve said target path string;

wherein said writing means comprises means for writing said new file using said file name at a location in said server platform identified by said target path string.

18. A database system for enabling an user to distribute a procedure from a client platform to a plurality of server platforms, and for enabling the user to make and register the procedure at the server platforms, a "DB2" relational database management system (RDBMS) executing on each server platform, the database system comprising:

means, at the client platform, for displaying a list of servers;

means, at the client platform, for enabling the user to select any of said servers;

CAE commanding means, at the client platform, for commanding a "client application enablement" (CAE) module to distribute a file associated with the procedure to the selected servers, the CAE module being resident in the client platform and representing a client component of the DB2 RDBMS; and make and register means, at the client platform, for commanding the CAE module to cause the selected servers to make and register the procedure;

wherein said CAE commanding means comprises:

means for converting the file to a string;

means for setting a procedure_to_invoke parameter equal to information identifying a file transfer procedure located at each selected server;

means for causing a pointer in a first "sqlvar" parameter to point to said string, and causing a pointer in a second sqlvar parameter to point to a file name of the file, the first and second sqlvar parameters being part of an input_args parameter, the input_args parameter having a "sqlda" data type, the sqlda data type being suitable for passing scalar values to procedures; and means for invoking for each selected server a "sqleproc" function provided by the CAE module, a parameter list of said sqleproc function comprising said input_args parameter and said procedure_to_ invoke parameter, said sqleproc function when executed causing said input_args parameter to be passed to said file transfer procedure at each selected server, and also causing said file transfer procedure to be invoked at each selected server.

19. The database system of claim 18, further comprising:

means, at each server, for receiving the input_args parameter;

means, at each server, for using said pointer in said first sqlvar parameter of the input_args parameter to access and retrieve said string;

means, at each server, for using said pointer in said second sqlvar parameter of the input_args parameter to access and retrieve said file name; and means, at each server, for writing said string to a new file in the server using said file name.

20. The system of claim 18, wherein said make and register means comprises:

means for setting the procedure_to_invoke parameter equal to information identifying a make function located at each selected server; and means for invoking for each selected server the "sqleproc" function, said sqleproc function when executed causing each selected server to invoke the make function, the make function when executed operating to make the procedure.

21. The system of claim 18, wherein said make and register means comprises:

means for setting the procedure_to_invoke parameter equal to information identifying a registration function located at each selected server; and means for invoking for each selected server the "sqleproc" function, said sqleproc function when executed causing each selected server to invoke the registration function, the registration function when executed operating to register the procedure with the DB2 RDBMS at said each selected server.

22. A program storage device readable by a machine, tangibly embodying a program of instructions executable by the machine to perform method steps for transferring a file from a client platform to a server platform, the server platform coupled to the client platform, a "DB2" relational database management system (RDBMS) executing on the server platform, said method steps comprising:

(1) at the client platform, converting the file to a string;

(2) at the client platform, causing a pointer in an input_args parameter to point to said string, said input_args parameter being of a "sqlda" data type, said pointer being part of a "sqlvar" parameter defined by the sqlda data type, the sqlda data type being suitable for passing scalar values to procedures; and (3) at the client platform, invoking a "sqleproc" function provided by a "client application enablement" (CAE) module, the CAE module being resident in the client platform and representing a client component of the DB2 RDBMS, a parameter list of said sqleproc function comprising said input_args parameter and a procedure_to_invoke parameter that identifies an user-specified procedure located on the server platform, said sqleproc function when executed causing said input_args parameter to be passed to said user-specified procedure at the server platform, and also causing said user-specified procedure to be invoked at the server platform.

23. A program storage device readable by a machine, tangibly embodying a program of instructions executable by the machine to perform method steps for transferring a file from a client platform to a server platform, the client platform coupled to the server platform, a "DB2" relational database management system (RDBMS) executing on the server platform, said method steps comprising:

(1) at the client platform, converting the file to a string;

(2) at the client platform, setting a procedure_to_invoke parameter equal to information identifying a file transfer procedure located at the server platform;

(3) at the client platform, causing a pointer in a first "sqlvar" parameter to point to said string, and causing a pointer in a second sqlvar parameter to point to a file name of the file, the first and second sqlvar parameters being part of an input_args parameter, the input_args parameter having a "sqlda" data type, the sqlda data type being suitable for passing scalar values to procedures; and (4) at the client platform, invoking a "sqleproc" function provided by a "client application enablement" (CAE) module, the CAE module being resident in the client platform and representing a client component of the DB2 RDBMS, a parameter list of said sqleproc function comprising said input_args parameter and said procedure_to_invoke parameter, said sqleproc function when executed causing said input_args parameter to be passed to said file transfer procedure at the server platform, and also causing said file transfer procedure to be invoked at the server platform.

24. The program storage device of claim 23, said method steps further comprising the steps of:

(5) at the server platform, receiving the input_args parameter;

(6) at the server platform, using said pointer in said first sqlvar parameter of the input_args parameter to access and retrieve said string;

(7) at the server platform, using said pointer in said second sqlvar parameter of the input_args parameter to access and retrieve said file name; and (8) at the server platform, writing said string to a new file in the server platform using said file name.

25. The program storage device of claim 24, said method steps further comprising the step of:

(9) at the client platform, causing a pointer in a third sqlvar parameter to point to a target path string.

26. The program storage device of claim 25, said method steps further comprising the step of:

(10) at the server platform, using said pointer in said third sqlvar parameter of the input_args parameter to access and retrieve said target path string;
wherein step (8) comprises the step of:
at the server platform, writing said string to a new file using said file name at a location in said server platform identified by said target path string.

27. A program storage device readable by a machine, tangibly embodying a program of instructions executable by the machine to perform method steps for transferring a file from a client platform to a server platform, the client platform coupled to the server platform, a "DB2" relational database management system (RDBMS) executing on the server platform, said method steps comprising:

(1) at the server platform, receiving an input_args parameter being of a "sqlda" data type, said input_args parameter comprising a "sqlvar" parameter defined by said sqlda data type, said sqlvar parameter comprising a pointer pointing to a string that was transferred from the client platform to the server platform, said string being a string representation of a file located on the client platform;

(2) at the server platform, using said pointer in said sqlvar parameter of the input_args parameter to access and retrieve said string;

(3) at the server platform, writing said string to a new file.

28. The program storage device of claim 27, wherein said input_args parameter comprises a second sqlvar parameter having a pointer that points to a file name of said file, and a third sqlvar parameter having a pointer that points to a target path string, said method steps further comprising the steps of:

(4) at the server platform, using said pointer in said second sqlvar parameter of the input_args parameter to access and retrieve said file name; and (5) at the server platform, using said pointer in said third sqlvar parameter of the input_args parameter to access and retrieve said target path string;
wherein step (3) comprises the step of:
at the server platform, writing said string to a new file using said file name at a location in said server platform identified by said target path string.

29. A program storage device readable by a machine, tangibly embodying a program of instructions executable by the machine to perform method steps for enabling an user to distribute a procedure from a client platform to a plurality of server platforms, and for enabling the user to make and register the procedure at the server platforms, a "DB2" relational database management system (RDBMS) executing on each server platform, said method steps comprising:

(1) at the client platform, displaying a list of servers;

(2) at the client platform, enabling the user to select any of said servers;

(3) at the client platform, commanding a "client application enablement" (CAE) module to distribute a file associated with the procedure to the selected servers, the CAE module being resident in the client platform and representing a client component of the DB2 RDBMS; and (4) at the client platform, commanding the CAE module to cause the selected servers to make and register the procedure;
wherein step (3) comprises the steps of:
(a) converting the file to a string;
(b) setting a procedure_to_invoke parameter equal to information identifying a file transfer procedure located at each selected server;
(c) causing a pointer in a first "sqlvar" parameter to point to said string, and causing a pointer in a second sqlvar parameter to point to a file name of the file, the first and second sqlvar parameters being part of an input_args parameter, the input_args parameter having a "sqlda" data type, the sqlda data type being suitable for passing scalar values to procedures; and
(d) invoking for each selected server a "sqleproc" function provided by the CAE module, a parameter list of said sqleproc function comprising said input_args parameter and said procedure_to_invoke parameter, said sqleproc function when executed causing said input_args parameter to be passed to said file transfer procedure at each selected server, and also causing said file transfer procedure to be invoked at each selected server.

30. The program storage device of claim 29, said method steps further comprising the steps of:

(5) at each server, receiving the input_args parameter;

(6) at each server, using said pointer in said first sqlvar parameter of the input_args parameter to access and retrieve said string;

(7) at each server, using said pointer in said second sqlvar parameter of the input_args parameter to access and retrieve said file name; and (8) at each server, writing said string to a new file in said each server using said file name.

31. The program storage device of claim 29, wherein step (4) comprises the step of:

setting the procedure_to_invoke parameter equal to information identifying a make function located at each selected server; and invoking for each selected server the "sqleproc" function, said sqleproc function when executed causing each selected server to invoke the make function, the make function when executed operating to make the procedure.

32. The program storage device of claim 29, wherein step (4) comprises the step of:

setting the procedure_to_invoke parameter equal to information identifying a registration function located at each selected server; and invoking for each selected server the "sqleproc" function, said sqleproc function when executed causing each selected server to invoke the registration function, the registration function when executed operating to register the procedure with the DB2 RDBMS at said each selected server.

33. The method of claim 1, wherein said file is a vector file.

34. The method of claim 2, wherein said file is a vector file.

35. The method of claim 6, wherein said file is a vector file.

36. The system of claim 12, wherein said file is a vector file.

37. The program storage device of claim 22, wherein said file is a vector file.

38. The program storage device of claim 23, wherein said file is a vector file.

39. The program storage device of claim 27, wherein said file is a vector file.

* * * * *